UNITED STATES PATENT OFFICE.

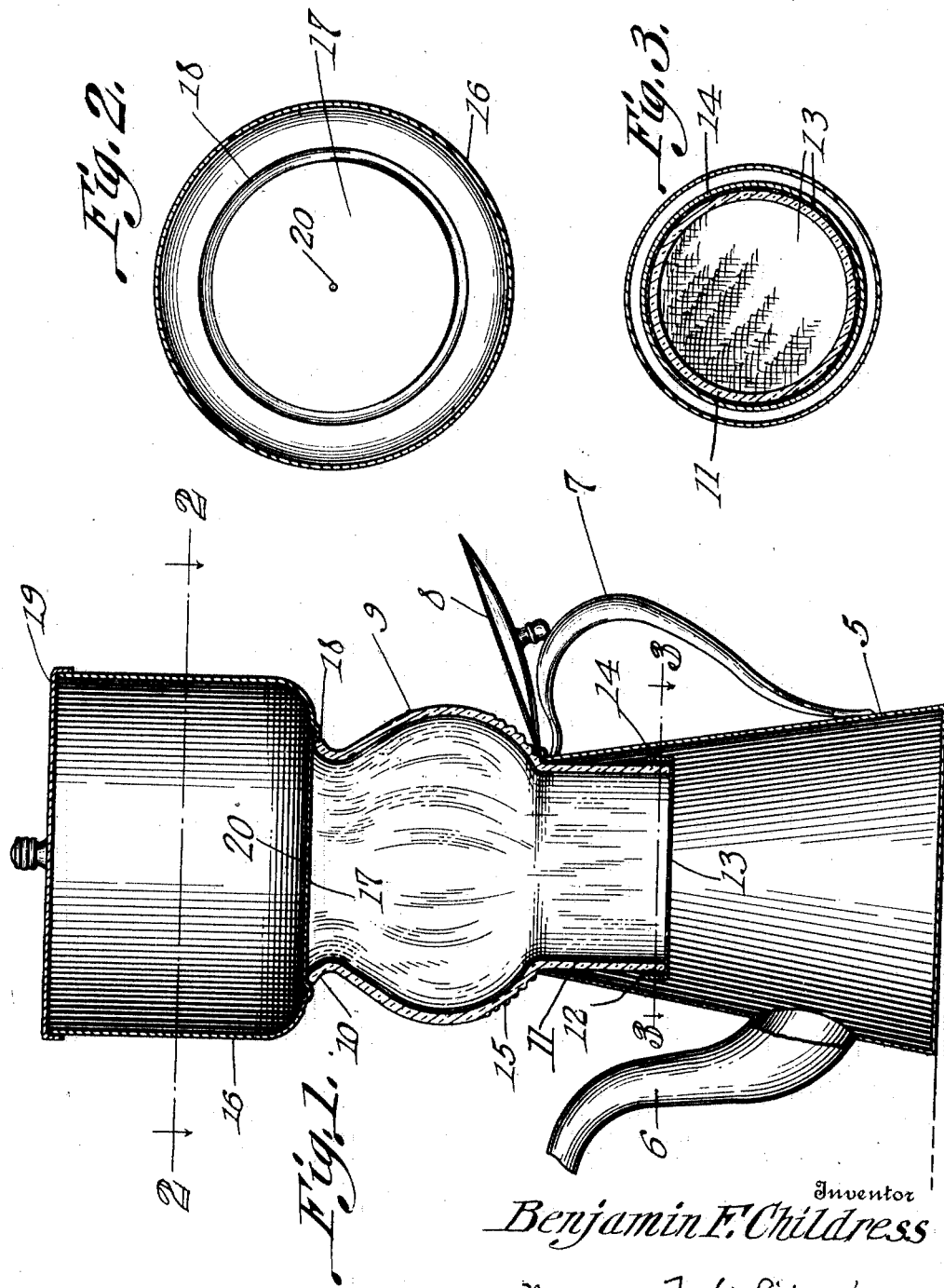

BENJAMIN F. CHILDRESS, OF LYNCHBURG, VIRGINIA.

PERCOLATOR.

1,315,908.    Specification of Letters Patent.    Patented Sept. 9, 1919.

Application filed September 10, 1918. Serial No. 253,449.

*To all whom it may concern:*

Be it known that I, BENJAMIN F. CHILDRESS, a citizen of the United States, and a resident of Lynchburg, in the county of Campbell and State of Virginia, have invented new and useful Improvements in Percolators, of which the following is a specification.

This invention relates to percolators and has particular reference to that class of percolators adapted to be used in connection with the conventional form of coffee pots.

An important object of the invention is to provide in a device of the character described, a means whereby the device as a whole may be readily adapted to use in connection with various sized coffee pots without altering or changing the construction of the coffee pot or the device embodying my invention.

A further object of the invention is to provide in a device of the above mentioned character, a means whereby the various elements comprising the invention may be held in a correct position with respect to each other.

A further object of the invention is to provide a device of the above mentioned character which is strong, durable, reliable in operation and inexpensive to manufacture.

Other objects and advantages of the inventiion will be apparent during the course of the following description.

In the accompanying drawings forming a part of this specification and in which like numerals are employed to designate like parts throughout the same, Figure 1 is a central, vertical, sectional view of a coffee pot showing the device embodying my invention associated therewith.

Fig. 2 is a horizontal, sectional view taken on a line 2—2 of Fig. 1, and

Fig. 3 is a horizontal sectional view taken on a line 3—3 of Fig. 1.

In the drawings wherein for the purpose of illustration is shown a preferred form of my invention, the numeral 5 indicates, as a whole, a coffee pot provided with a spout 6, a handle 7, and a conventional form of closure 8.

Upon the coffee pot 5 there is arranged a container 9 having formed at its upper edge a lip 10. This container is preferably of glass and is provided at its lower edge with an elongated flange 11 which extends an appreciable distance into the coffee pot 5 as clearly shown in Fig. 1. The flange 11 is provided at its lower edge with a roughened peripheral face as shown at 12 in order that the strainer cloth 13 may be thoroughly secured in position upon the flange 11 when a metallic ring 14 is passed over the flange 11. This strainer cloth 13 is preferably of flannel. The container 9 is provided adjacent the flange 11 with a plurality of peripheral grooves 15 which are adapted to retain the container 9 in an upright position when placed upon the coffee pot 5. By reason of the fact that the grooves 15 are formed upon the surface of the container 9 whose walls are grooved, the container 9 is adapted to be held in position upon any reasonably large or small coffee pot.

Upon the container 9 there is disposed a reservoir 16 having its bottom 17 provided with an annular ring 18, within which the lip 10 of the container 9 is adapted to fit. The ring 18 serves as a means for retaining the reservoir 16 in a desired position upon the container 9. The reservoir 16 is provided with a conventional closure 19 and within the bottom 17 there is formed an aperture 20 leading into the container 9.

In use ground coffee is placed within the container 9, the container being placed upon the coffee pot 5 in the position clearly shown in Fig. 1. A desired quantity of water is then placed within the reservoir 16, the amount of water depending upon the amount of coffee grounds deposited within the container 9 and the quantity of coffee desired to be made. The reservoir containing the water is then placed upon the container 9 whereupon the water is directed into the container 9 and allowed to percolate through the coffee grounds and the strainer cloth 13 whereupon it is collected in the coffee pot 5.

I prefer to use a cloth 13 sufficiently thick to prevent the water when deposited into the container 9 from the reservoir 16 from immediately flowing through the coffee grounds into the coffee pot 5, in which instance the water will rise approximately three or four inches until the pressure is sufficient to cause percolation, thereby giving the coffee grounds time to become thoroughly saturated and also giving the container 9, when glass is used, sufficient time to become gradually hot thereby eliminating the probability of its becoming broken due to sudden heating thereof and at the same time enabling me to use a quality of glass having such characteristics as would cause it to withstand the heat transmitted thereto as a result of boiling water being rapidly deposited into the container 9.

It is to be understood that the form of my invention herewith shown and described is to be taken as a preferred example of the same, and that various changes in the shape, size, and arrangement of parts may be resorted to without departing from the spirit of the invention or the scope of the subjoined claims.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention what I claim is:

A percolator for coffee pots comprising a substantially spherical shaped container adapted to be seated upon the top of the coffee pot, a depending cylindrical flange secured to said container and adapted to extend into the coffee pot, said flange being diametrically smaller than said container, said container being provided relatively near said flange with a plurality of grooves, each groove being adapted to receive the upper end of a coffee pot having a corresponding circumference to snugly fit in said groove, said flange being provided at its lower end with a roughened peripheral face, an annular ring encircling said flange, a strainer cloth having its peripheral edge confined between said ring and said roughened face, and a reservoir removably mounted upon said container, said reservoir having its bottom provided centrally with an opening to permit the contents thereof to flow from the reservoir into the container whereupon said contents is permitted to pass into the coffee pot through said strainer cloth.

BENJAMIN F. CHILDRESS.

Copies of this patent may be obtained for five cents each, by addressing the "Commissioner of Patents, Washington, D. C."